June 11, 1957  R. M. HAINSFURTHER  2,795,083
METHOD AND APPARATUS FOR MINIMIZING
WAVE IN ROLLED GLASS
Filed Feb. 18, 1953

INVENTOR.
ROBERT M. HAINSFURTHER

BY
Oscar L. Spencer
ATTORNEY

United States Patent Office 2,795,083
Patented June 11, 1957

2,795,083

METHOD AND APPARATUS FOR MINIMIZING WAVE IN ROLLED GLASS

Robert M. Hainsfurther, Brackenridge, Pa., assignor to Pittsburgh Plate Glass Company, Allegheny County, Pa., a corporation of Pennsylvania Application February 18, 1953, Serial No. 337,454

5 Claims. (Cl. 49—47)

This invention relates to improved methods and apparatus for forming rough plate glass, and more particularly to conveying a sheet of rolled glass as it is cooled and annealed in an annealing lehr in such a manner that the glass retains a minimum of surface waviness.

In the formation of plate glass, a continuous ribbon of molten glass is drawn from a tank between a pair of forming rolls. The glass ribbon in passing through the forming rolls is sufficiently chilled to retain the general shape imparted thereby.

Leaving the forming rolls, the ribbon of glass is usually picked up on a series of apron rolls which are smaller than the forming rolls and serve to convey the ribbon from the forming rolls to an annealing lehr. On the apron, the glass loses heat rapidly and the temperature of the glass sheet falls from about 1700° F. on leaving the forming rolls to about 1500° F. entering the lehr.

The lehr is essentially an open tunnel in which graduated temperatures are obtained by means of gas fires or other means within the lehr. The heating means are so controlled that the glass cools very rapidly from about 1500° F. to about 1150° F., very slowly from about 1150° F. to about 950° F., and again rapidly to room temperature. The temperature range at which the temperature is varied very slowly, mainly from about 1150° F. to about 950° F. is known as the annealing range of the glass. The limits of the annealing range vary with the composition of the glass within the lehr. In this range, the temperatures of the surfaces and the internal body of the glass are equalized while the glass is still sufficiently soft to permit the structural arrangement necessary to relieve the strain introduced into the glass as the sheet is formed. Unless strains are relieved, the glass is left in an unstable condition and tends to fracture after it becomes cool. After the glass is cooled below the lower limit of the annealing range, no further annealing takes place. Any further strains introduced into the glass by rapid cooling are temporary and relieve themselves as the temperature of the sheet becomes uniform.

The glass leaves the end of the lehr at a temperature of about 400° F. and enters a cooling section, where the surrounding air has free access to the glass and rapidly cools it. Rough rolled plate glass leaving the cooling section of the lehr is inspected and defective sections removed. The glass is then cut, ground and polished in order to form finished plate glass.

As the hot ribbon of glass passes through the lehr, it is supported by a plurality of supporting conveyor rolls. These rolls assist in the forward displacement of the heated glass toward the cool end of the lehr. As the heated glass passes over these rolls, which are rotated in the direction of movement of the glass, undulations appear in the major surfaces of the rough rolled plate glass. In order to remove the undulations, a great deal of grinding and polishing is subsequently necessary.

Heretofore, one roll, rolling at the same rotational speed but having a larger diameter than the other conveyor rolls and supported on an axis in the horizontal plane defined by the axes on which the other conveyor rolls rotate, has been utilized to break up the wave formed as the glass passes through the hot end of the lehr. This has necessitated the maintenance of an inventory of replacement rolls of two sizes.

According to this invention, a roll identical in size to the remainder of the conveyor rolls is inserted across the annealing lehr at a point in the lehr where the glass temperature is slightly above the upper portion of the annealing range. This roll is mounted to rotate on an axis higher than the axes of rotation of the remaining glass sheet supporting rolls and at a higher speed. Surprisingly, this substitution of a roll identical in diameter to the other lehr rolls but rotating at a higher angular velocity and mounted on a slightly higher axis than the other lehr rolls results in a substantial reduction of wave in the rough plate glass surfaces due to the rubbing action between the uppermost line of contact between the periphery of the high speed roll and the under surface of the soft glass ribbon. This rubbing tends to minimize the irregularities not only in the bottom surface of the conveyed glass ribbon, but, surprisingly, in its upper surface also.

Accordingly, it is a primary object of the present invention to minimize the wave in the surfaces of rough plate glass in order to lessen the amount of subsequent grinding and polishing that is required to convert the rough plate glass into a sheet of polished plate glass.

Another object of the present invention is to simplify the inventory problems relating to the storage of replacement lehr rolls.

These and other objects of the present invention will become apparent upon further study of the following specification taken in connection with the accompanying drawing.

Figure 1:
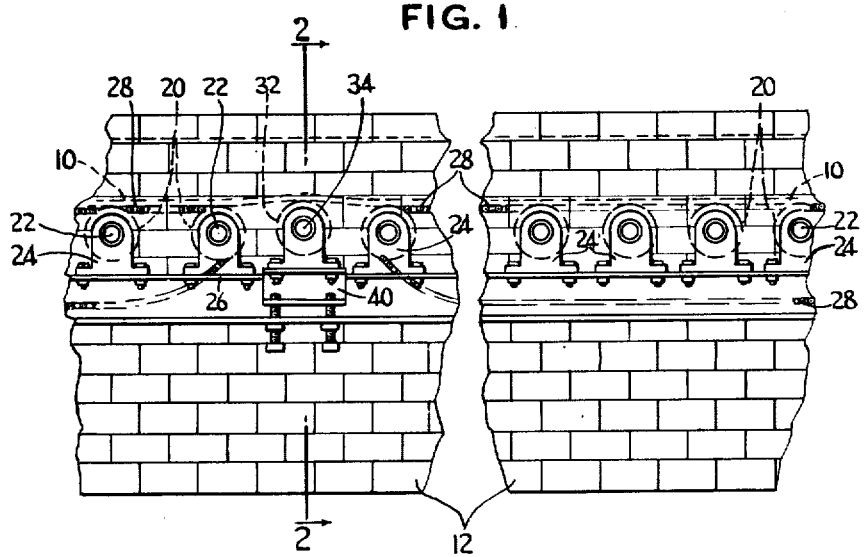
Fig. 1 represents a side view of that portion of an annealing lehr wherein the temperature of the glass sheet passing therethrough is approximately at the upper portion of the annealing range, the lehr being provided with one relatively high speed roll according to the present invention.
Figure 2:
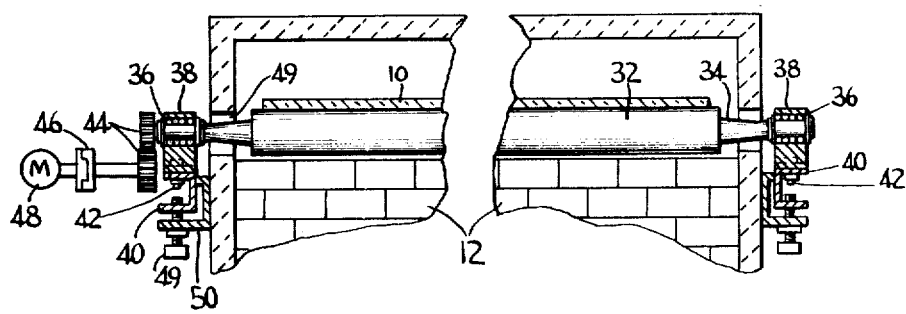
Fig. 2 is a view partly in section and partly in elevation taken at right angles to the view of Fig. 1 along the line 2—2 looking down the lehr toward its cooling end.

Referring to the drawings, a continuous ribbon of hot, rough plate glass 10 is introduced into a lehr 12 from the tank and apron (not shown). The lehr 12 is a substantially closed chamber whose internal heat is regulated from approximately the temperature of the ribbon leaving the apron at the end where it enters the lehr to a lower temperature, approximately 400° F., at the exit end of the lehr. Driving rolls 20 are provided under the glass ribbon to impart a motion to the glass toward the exit end of the lehr. These driving rolls are each keyed to a drive shaft 22 journaled in a pair of bearings integral with mounting brackets 24 mounted on a support structure 26.

A plurality of driven rolls 20', identical with the driving rolls and which are driven at the same angular velocity as driving roll 20 by means of a suitable chain drive 28, support the sheet as the latter is transported from the hotter to the cooler end of the lehr. Rolls 20 and 20' are close enough together to prevent sagging of the glass between adjacent supporting rolls but are spaced sufficiently to provide economical use of the lehr rolls.

At the portion of the lehr where the temperature of the glass is slightly above but approaches the upper limit of the annealing range, a special roll 32 is provided.

This roll 32 is keyed to a drive shaft 34 journaled in bearings 36 contained in bearing housing 38 at either end of the drive shaft. The bearing housings are mounted on suitable support brackets 40 by means of fastening members 42. Suitable gearing 44 is provided for rotating the special roll 32 at a speed such that its glass engaging surface travels faster than the glass sheet. This is accomplished by the provision of a suitable clutch mechanism 46 which imparts a rotational movement to the roll 32 from a variable, high speed motor 48 by means of the gears 44. The rotation imparted by motor 48 is independent of the rotation of driving or driven rolls 20.

This special roll 32 has the same diameter as rolls 20 and is mounted so that its axis is slightly higher than the axes of the remaining glass supporting rolls. Best results have been obtained when the axis of the special roll 32 is raised from about 1/8" to about 1/2" above the axes of the other sheet supporting rolls.

While the special roll may be permanently mounted at this slightly elevated position, preferably provision is made for adjustably positioning the elevation of this roll by means of a suitable elevating mechanism 49 and 50.

According to prior art practice utilizing a larger diameter roll supported for rotation in the same plane as the conveyor rolls at the same rotational speed as the latter, wave is present in rough rolled glass as follows:

For glass having a thickness of .175 inch proceeding at a lehr speed of 170 inches per minute, a top surface wave of .012 inch and a bottom surface wave of .008 inch is produced in the annealed rough glass. According to the practice of the present invention, by inserting a high speed roll located in the lehr where the glass is slightly above the upper limit of the annealing range and raised 1/8" above the remaining lehr rolls when rotating at a roll speed of 200 inches per minute, the top surface wave was reduced to .009 inch and the bottom surface wave reduced to .004 inch. This resulted in a total reduction of wave of .007".

In rolling rough glass having a thickness of .292" and passing through the lehr at 99" per minute, a top surface wave of .022 inch and a bottom surface wave of .015 inch was produced prior to the installation of a high speed roll. When my high speed lehr roll was substituted for one of the conventional rolls, a substantial reduction in wave of the surfaces of rough plate glass was obtained as follows:

| Thickness, inches | Lehr Speed, inches per minute | Top Surface Wave, inches | Bottom Surface Wave, inches |
|---|---|---|---|
| .287 | 108 | .012 | .004 |
| .295 | 103 | .014 | .004 |

During the above operations the high speed roll of my invention was running at a peripheral speed of 200 inches per minute and was elevated 1/8 of an inch above the level of the other lehr rolls.

More specifically, it has been found that in annealing glass having a composition as follows:

Percent by weight
$SiO_2$ ---- 71.52
$Na_2O$ ---- 13.54
$CaO$ ---- 11.81
$MgO$ ---- 2.38
$SO_3$ ---- .37
$Cl_2$ ---- .06
$Fe_2O_3$ ---- .12
$Al_2O_3$ ---- .20
———
100.

and having an annealing range between 1040° F. and 935° F., the special roll provided optimum results when located at a point in the lehr where the temperature of the moving glass sheet is between 1070° F. and 1050° F. However, in general, some improvement is afforded even when the special roll is located at a position where the glass temperature exceeds the annealing range by 250° F. or more.

I claim:

1. In annealing a continuous ribbon of rolled glass conveyed horizontally in a lehr of progressively diminishing temperatures from above to below the annealing range thereof, the improvement which comprises simultaneously flexing and rubbing the bottom surface only of the ribbon in the direction of its travel within the lehr at a temperature between 10.70° F. and 1050° F. by contacting said bottom surface with a rubbing element whose glass contacting surface is above the plane of the bottom surface and moving said rubbing element in the direction of glass movement at a speed substantially greater than the conveyor speed in order to minimize the surface inhomogeneities of the rolled glass while the glass is still in a plastic condition.

2. In annealing a continuous ribbon of rolled glass conveyed horizontally in a lehr of progressively diminishing temperatures from above to below the annealing range of the glass, the improvement which comprises rubbing the bottom surface only of the glass ribbon in the direction of its travel within the lehr and simultaneously flexing the ribbon while the glass is at a temperature between 10° F. and 30° F. above the top of its annealing range by contacting said bottom surface with a rubbing element whose glass contacting surface is above the plane of the bottom surface and moving said rubbing element in the direction of glass movement at a speed substantially greater than the conveyor speed in order to minimize the surface inhomogeneities of the rolled glass while the glass is still in a plastic condition.

3. In annealing a continuous ribbon of rolled glass conveyed horizontally in a lehr of progressively diminishing temperatures from above to below the annealing range thereof, the improvement which comprises rubbing the bottom surface only of the ribbon in the direction of its travel substantially uniformly across its entire width and simultaneously flexing the ribbon while the glass is at a temperature between 10° F. and 30° F. above the top of its annealing range by contacting said bottom surface with a rubbing element whose glass contacting surface is above the plane of the bottom surface and moving said rubbing element in the direction of glass movement at a speed substantially greater than the conveyor speed in order to minimize the surface inhomogeneities of the rolled glass while the glass is still in a plastic condition.

4. In an annealing lehr comprising an inlet for the introduction of molten plate glass, a first zone where the molten glass is cooled to its softening point, a second zone where the glass is cooled to the top of its annealing range, an annealing zone, and an outlet for the withdrawal of rough rolled plate glass and provided with a conveyor including a plurality of equal diameter, glass sheet supporting rolls rotatable at a given angular velocity about spaced axes extending transversely of the direction of glass travel, said axes being disposed along a horizontal plane, the improvement comprising a special roll of the same diameter as said supporting rolls disposed on an axis of rotation slightly above the plane of the axes of rotation of the rotatable support rolls and contacting the under-surface of the glass ribbon to provide a simultaneously rubbing and flexing action thereagainst in the second zone of the lehr where the glass temperature is between 10° F. and 30° F. above the top of the annealing range of the glass and means for rotating the special roll at a greater angular velocity than the glass sheet supporting rolls.

5. The improvement according to claim 4, including support means for said special roll and means for raising and lowering said support means.

References Cited in the file of this patent

UNITED STATES PATENTS

| | | |
|---|---|---|
| 560,759 | Smith | May 26, 1896 |
| 820,205 | Keighley | May 8, 1906 |
| 855,185 | Keyes | May 28, 1907 |
| 966,653 | Colburn | Aug. 9, 1910 |
| 1,032,239 | Player | July 9, 1912 |
| 1,447,654 | Fowle | Mar. 6, 1923 |
| 1,497,798 | Slingluff | June 17, 1924 |
| 1,870,002 | Eckert | Aug. 2, 1932 |
| 1,999,562 | Galey | Apr. 30, 1935 |
| 2,032,009 | Gelstharp et al. | Feb. 25, 1936 |

FOREIGN PATENTS

| | | |
|---|---|---|
| 292,448 | Great Britain | June 11, 1928 |
| 994,845 | France | Aug. 14, 1951 |

UNITED STATES PATENT OFFICE

CERTIFICATE OF CORRECTION

Patent No. 2,795,083                              June 11, 1957

Robert M. Hainsfurther

It is hereby certified that error appears in the printed specification of the above numbered patent requiring correction and that the said Letters Patent should read as corrected below.

Column 4, line 16, for "10.70° F." read -- 1070° F. --; line 70, for "simultaneously" read -- simultaneous --.

Signed and sealed this 8th day of October 1957.

(SEAL)
Attest:

KARL H. AXLINE
Attesting Officer

ROBERT C. WATSON
Commissioner of Patents

Dedication 2,795,083.—*Robert M. Hainsfurther*, Brackenridge, Pa. METHOD AND APPARATUS FOR MINIMIZING WAVE IN ROLLED GLASS. Patent dated June 11, 1957. Dedication filed July 25, 1973, by the assignee, *PPG Industries, Inc.*

Hereby dedicates the remainder of its term to the free use and benefit of the People of the United States.

[*Official Gazette December 4, 1973.*]